United States Patent
Helwich et al.

(10) Patent No.: US 9,272,609 B2
(45) Date of Patent: Mar. 1, 2016

(54) METHOD FOR CLOSING A CONVERTIBLE SOFT TOP

(71) Applicant: MAGNA Car Top Systems GmbH, Bietigheim-Bissingen (DE)

(72) Inventors: Dirk Helwich, Vaihingen/Enz (DE); Michael Stahmer, Munich (DE); Berthold Klein, Sachsenheim (DE)

(73) Assignee: MAGNA Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 14/466,986

(22) Filed: Aug. 23, 2014

(65) Prior Publication Data

US 2015/0057842 A1 Feb. 26, 2015

(30) Foreign Application Priority Data

Aug. 23, 2013 (DE) .................. 10 2013 216 876

(51) Int. Cl.
*B60J 7/057* (2006.01)
*G07C 5/00* (2006.01)
*H04N 7/18* (2006.01)

(52) U.S. Cl.
CPC .............. *B60J 7/0573* (2013.01); *G07C 5/008* (2013.01); *G08C 2201/93* (2013.01); *H04N 7/18* (2013.01)

(58) Field of Classification Search
CPC ........ B60J 7/057; B60J 7/0573; G07C 5/008; G07C 5/085; G08C 2201/93
USPC ....................................... 701/2, 49
See application file for complete search history.

(56) References Cited

U.S. PATENT DOCUMENTS

| | | | |
|---|---|---|---|
| 6,937,141 B2 * | 8/2005 | Muramatsu | 340/426.13 |
| 7,026,930 B2 * | 4/2006 | Appel et al. | 340/541 |
| 7,464,980 B2 * | 12/2008 | Gutendorf et al. | 296/107.01 |
| 8,326,259 B2 * | 12/2012 | Gautama et al. | 455/404.1 |
| 8,751,065 B1 * | 6/2014 | Kato | 701/2 |
| 8,948,923 B2 * | 2/2015 | Scheider et al. | 701/1 |
| 8,983,534 B2 * | 3/2015 | Patel | 455/556.1 |
| 2006/0178795 A1 * | 8/2006 | Queveau et al. | 701/49 |
| 2012/0221173 A1 * | 8/2012 | Ampunan et al. | 701/2 |
| 2012/0282913 A1 * | 11/2012 | Kaindl et al. | 455/420 |
| 2014/0095031 A1 * | 4/2014 | Boblett et al. | 701/49 |

FOREIGN PATENT DOCUMENTS

| | | | | |
|---|---|---|---|---|
| DE | 10232413 A1 | | 2/2004 | |
| DE | 102006002391 A1 * | | 7/2007 | |
| DE | 102006062772 A1 * | | 5/2008 | B60J 7/057 |

(Continued)

OTHER PUBLICATIONS

EPO machine translation of DE 102010046617 A1 (original DE document published Jul. 14, 2011).*
JPO machine translation of JP 2007-49469 A (original JP document published Feb. 22, 2007).*

*Primary Examiner* — Behrang Badii
*Assistant Examiner* — David Testardi
(74) *Attorney, Agent, or Firm* — Jordan IP Law, LLC; Todd A. Vaughn

(57) ABSTRACT

A method for operating a convertible top of a motor vehicle. The convertible top may be a soft top which may be opened and closed in an electric or hydraulic manner using, in a non-limiting embodiment, a mobile device after the mobile device receives data relating to the monitoring of an interior space and an exterior region of the motor vehicle.

16 Claims, 2 Drawing Sheets

(56) References Cited

FOREIGN PATENT DOCUMENTS

Figure 1:
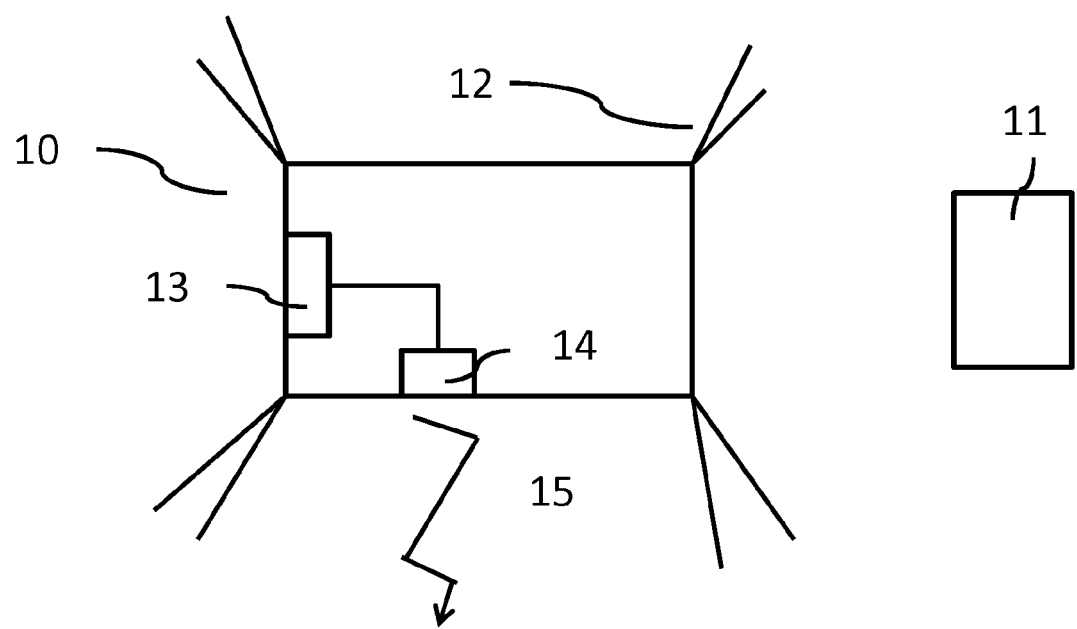

| DE | 102008034606 | A1 | | 1/2010 |
| DE | 102010046617 | A1 | * | 7/2011 |
| EP | 1354740 | A1 | | 10/2003 |
| JP | 2007049469 | A | * | 2/2007 |

* cited by examiner

METHOD FOR CLOSING A CONVERTIBLE SOFT TOP

CROSS-REFERENCE TO RELATED APPLICATIONS

The present application claims priority under 35 U.S.C. §119 to German Patent Application No. DE 10 2013 216 876.4 (filed on Aug. 23, 2013), which is hereby incorporated by reference in its entirety.

TECHNICAL FIELD

Embodiments relate to a method for closing a convertible soft top on a motor vehicle, such as, for example, a cabriolet vehicle. The convertible soft top may be opened and closed in an electric or hydraulic manner. The motor vehicle may comprise an interior space monitoring system and a surroundings monitoring system.

Embodiments further relate to a method that may be implemented in executable software as a set of logic instructions stored in a machine- or computer-readable medium of a memory.

BACKGROUND

Motor vehicles, particularly high value vehicles, having convertible soft tops are actuated and closed and opened in an electric or hydraulic manner. The closing and opening process is controlled by a switch in the interior of the vehicle.

There is, however, a specific requirement to control the process of closing or opening the convertible soft top by way of a remote control so that the driver can also close the convertible soft top from a distant location, such as, for example, it begins to rain.

For this purpose, such conventional motor vehicles include construction kits that render it possible for the driver to open and to close the convertible soft top by way of a radio key or a portable remote control that is connected to the vehicle via a Bluetooth® interface. The operation both by way of a radio key and a Bluetooth® interface is operated within visible range of the vehicle, and the driver can directly observe whether a danger for third parties occurs as a result of the movement of the convertible soft top.

There is also a need to close a convertible soft top from a location that is a greater distance away, in which in this case there is always the danger that people or objects become jammed in the convertible soft top.

It is a considerable problem to provide an automatic obstruction sensor for a cabriolet. As a result of the multitude of possible parameters, an automatic monitoring system by way of sensors, be they visual or movement sensors, is nearly impossible.

SUMMARY

In accordance with embodiments, a method is provided to open and close a convertible soft top of a motor vehicle from a spatially distant location, wherein a user of the method ultimately assumes responsibility for the opening and closing process. In such a method, the user is provided relevant information and a basis for decision-making with which said user can make a decision.

In accordance with embodiments, a method is provided for closing a convertible soft top on a motor vehicle, such as, for example, a cabriolet vehicle, wherein the convertible soft top is opened and closed in an electric or hydraulic manner, and the motor vehicle comprises an interior space monitoring system and a surroundings monitoring system, wherein the data of the interior space monitoring system and the surroundings monitoring system are transmitted by way of an air interface to a mobile control device and the process of opening and closing the convertible soft top may be switched by way of the air interface.

In accordance with embodiments, a method of operating a convertible top of a vehicle may include at least one of: providing a first monitoring system to monitor an interior space of the vehicle and a second monitoring system to monitor an exterior region outside of the vehicle; transmitting data from the first monitoring system and the second monitoring system to a mobile device; and actuating the convertible top, via the mobile device, after transmitting the data.

In accordance with embodiments, a method of operating a convertible top of a vehicle may include at least one of: monitoring an interior space of a vehicle and an exterior region outside of the vehicle; transmitting data relating to the monitoring of the interior space and the exterior region to a mobile device; and actuating the convertible top, via the mobile device, after transmitting the data.

In accordance with embodiments, a computer implemented method of operating a convertible top of a vehicle includes: monitoring an interior space of a vehicle and an exterior region outside of the vehicle; transmitting data relating to the monitoring of the interior space and the exterior region to a mobile device; and actuating the convertible top, via the mobile device, after transmitting the data.

In accordance with embodiments, a computer implemented method includes: monitoring an interior space of a vehicle and an exterior region outside of the vehicle; authenticating an identity of a user of the vehicle; transmitting data relating to the monitoring of the interior space and the exterior region to the user upon a positive authentication of the identity of the user; and actuating a convertible top of the vehicle after transmitting the data.

As a result of using the data of the interior space monitoring system and the surroundings monitoring system, it is possible in a simple manner to transmit an image of the vehicle and the conditions in the interior of the vehicle to the user in order to thus offer said user a basis for decision making.

It is furthermore advantageous that the air interface of the vehicle may be contacted by or otherwise in electrical communication with the mobile control device, and the data of the interior space monitoring system and the surroundings monitoring system may be provided after identifying the mobile control device. As a consequence, it is ensured that visual data may be seen only by the user of the vehicle, and as a result of the identification process, only the user can contact or otherwise electrically communicate with the vehicle.

The air interface is advantageously a standard interface from the group consisting of Bluetooth®, mobile network, WiMax® and WLAN. It is particularly advantageous if the interfaces are available for mobile networks since modern mobile network devices are available as mobile control units. Advantageously, the user consequently also has a remote control.

An advantageous system of monitoring the interior space of the motor vehicle, and also the surroundings of the motor vehicle may be performed via one or more sensors, such as, for example, camera sensors. The process of monitoring the surroundings results in a birdview image that is available in modern vehicles.

As a result of using mobile network devices, it is possible to install software that renders it possible to contact the control system of the vehicle and to provide an identification of the user.

DRAWINGS

Embodiments are illustrated in the drawings and are explained in more detail in the description below:

FIG. 1 schematically illustrates the components of implementation of the method, in accordance with embodiments.

Figure 2:
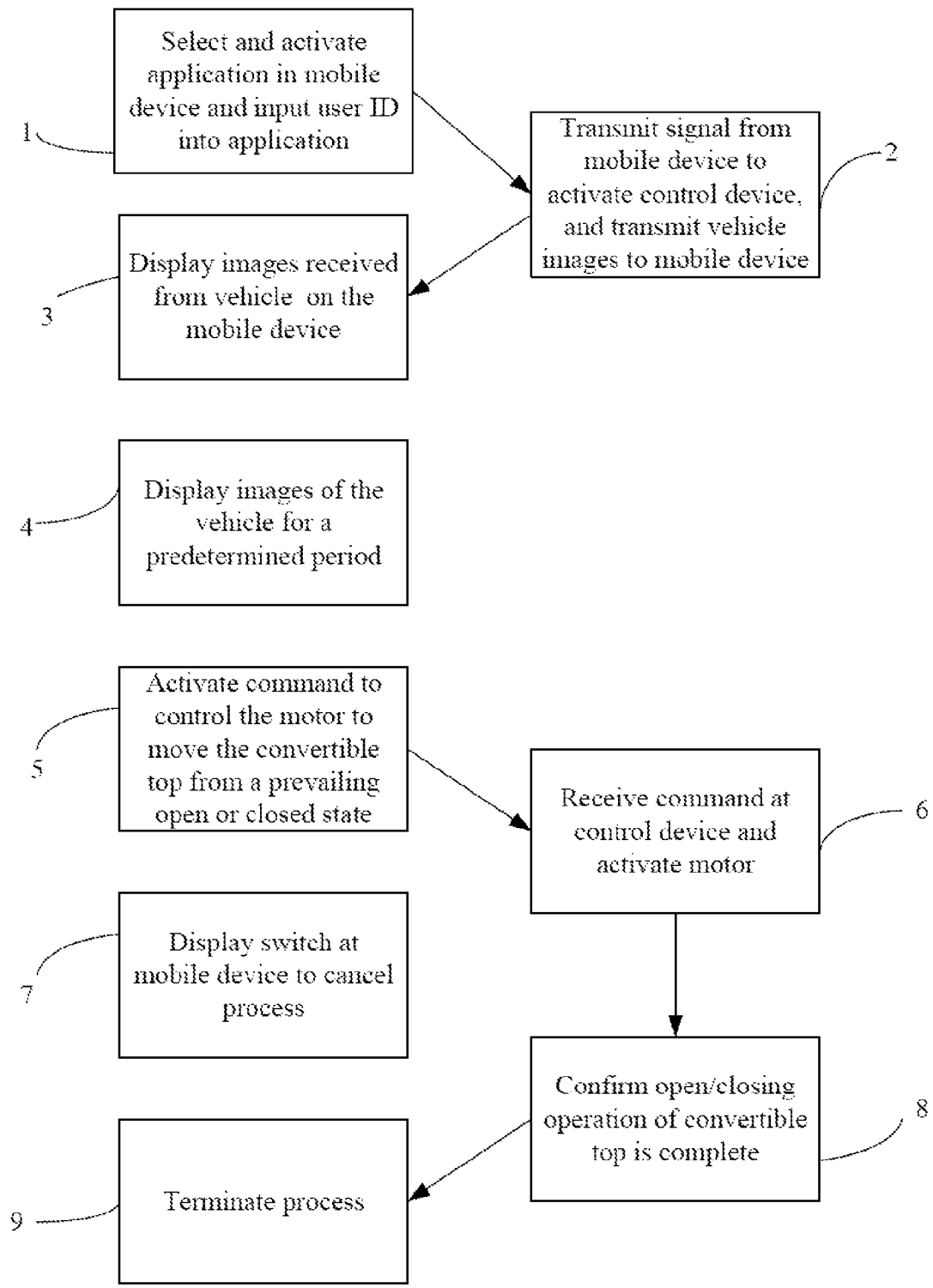

FIG. 2 schematically illustrates a method, in accordance with embodiments.

DESCRIPTION

FIG. 1 schematically illustrates the components that are necessary to implement the method, in accordance with embodiments. A motor vehicle 10 is schematically illustrated, and which includes one or more individual monitoring regions 12 arranged at an outer region/surface of the vehicle 10. The monitoring regions 12 are generally arranged in an overlapping manner so that the internal vehicle software can generate a general video view and a so-called birdview image from the images from the sensors.

A monitoring unit 13 is likewise located at or within the interior of the vehicle 10. The monitoring unit 13 may comprise a sensor such as a video sensor (e.g., a camera) that overlooks the entire interior space of the vehicle 10. A particularly advantageous spatial position is to arrange the monitoring unit 13 in or at an interior mirror of the vehicle 10. Embodiments are not limited to such a spatial position, and thus, the monitoring unit 13 may be spatially located at any interior space of the vehicle 10.

The monitoring unit 13 may be operatively connected to or in communication with a control device 14 that may relay the images captured by the monitoring unit 13 to other units of the vehicle 10. The control device 14 may be operatively connected to or in communication with another control device of the vehicle 10, or may serve a part of the overall control system of the vehicle 10. The control device 14 may comprise an air interface 15 that renders it possible for a user to contact or communicate with the control device 14 from an exterior of the vehicle 10. The data obtained from monitoring the outer regions 12 is likewise sent to and received by the control device 14. The vehicle 10 may be contacted with the aid of a mobile device 11 by way of the air interface 15.

In this case, the mobile device 11 may comprise any mobile device having a functionality that renders it possible to implement software packages in the form of apps and to display images on a display. Such an electronic mobile device may include, for example, a mobile Internet device (MID), personal digital assistant (PDA), a smart device such as a smart phone, smart tablet, smart TV and the like, or any combination thereof.

FIG. 2 illustrates a sequence of the method in accordance with embodiments. The process steps of the mobile device 11 are provided on the left-hand side, the process steps that take place within the vehicle 10 are provided on the right-hand side.

In step 1, a user selects software in the mobile device 11 and loads said software into an active state. This process may be achieved with the aid of a so-called application, such as a small software application, by way of example on a smartphone. At this point in time, the software that is loaded demands an identification of the user. After the user has identified him or herself to the software, the mobile device 11 produces the connection to the air interface 15 of the vehicle 10. It is, however, also possible that the device 11 connects directly to the control device of the vehicle 10 upon selecting the software since the devices are "paired" and that suffices as identification.

Next, in step 2, the signal of the mobile device 11 is received by way of the air interface 15 of the vehicle 10 and the control device 14 activates. The sensor (e.g., camera system) of the monitoring unit 13 is likewise switched on with the activation of the control device 14 and the images from the monitoring unit 13 are provided in the control unit 14. After the switching on process and the identification process, the images are transmitted directly to the mobile device 11 by way of the air interface 15. As a consequence, the mobile device 11 receives a current representation of the situation in the interior and exterior of the vehicle 10.

Next, in step 3, the mobile device 11 displays the images of the vehicle 10 on the screen. The software of the mobile device 11 alternates the representation from the interior space monitoring system into the overview image, and vice versa.

Next, in step 4, the illustration of the visual situation of vehicle 10 as a current transmission is kept for a specific period of time. For example, the cycle of the images may be maintained at a range of between 30 to 60 seconds. Parallel to this, information is displayed that indicates to the user that he/she may cancel the process at any time.

Next, in step 5, after the preset time period has elapsed, the software of the mobile device 11 triggers a command with which the convertible soft top is brought from a respective prevailing state (open or closed) into the other state.

Next, in step 6, the control device 14 of the vehicle 10 receives the control signal of the mobile device 11 by way of the air interface 15 and actuates the motor of the convertible soft top.

In step 7, parallel to automatically triggering the process of closing or opening the convertible soft top, the software of the mobile device provides a switch with which the user can cancel the process at any time, if the current image that the mobile device 11 represents can identify a person or object that is dangerously near, such as, for example, within a specific spatial zone or area of the vehicle 10. The software switch that is displayed represents an emergency stop switch.

Alternatively, the actuating switch on the mobile device 11 must be permanently depressed so that the operation is implemented. An interruption of the connection leads in this case to stopping the movement of the roof.

Next, in step 8, the control device 14 confirms that the process of opening or closing the convertible soft top is complete.

Next, in step 9, the software of the mobile device 11 then terminates the process and logs out of the vehicle 10, in which the control device 14 of the vehicle 10 is brought back into an idle mode.

In an alternative to the automatic opening process by way of the software of the mobile device 11, it is also possible for the user to issue the command to open and/or close the convertible soft top. For this purpose, in the waiting phase of step 4, the user directly presses a likewise previously displayed trigger.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of operating a convertible top of a vehicle, the method comprising:
   monitoring an interior space of the vehicle and an exterior region outside of the vehicle;
   transmitting data relating to the monitoring of the interior space and the exterior region to a mobile device; and
   actuating the convertible top, via the mobile device, after transmitting the data,
   wherein the mobile device provides an option to cancel a process of opening or closing the convertible top of the vehicle when the transmitted data indicates that an object is within a specific spatial zone of the vehicle, and
   wherein actuation of the convertible top is performed after displaying the data for a specific predetermined period of time.

2. The method of claim 1, further comprising, prior to transmitting the data, authenticating the identity of a user of the vehicle via the mobile control device.

3. The method of claim 1, wherein transmitting the data comprises transmitting the data via an air interface to the mobile device.

4. The method of claim 3, wherein the air interface is selected from the group consisting of Bluetooth®, mobile network, WiMAX® and WLAN.

5. The method of claim 1, wherein monitoring the interior space is performed via a video monitoring system.

6. The method of claim 1, wherein the video monitoring system comprises a camera monitoring system.

7. The method of claim 1, wherein monitoring the exterior region is performed via a video monitoring system.

8. The method of claim 7, wherein the video monitoring system comprises camera sensors that generate a birdview image.

9. The method of claim 1, wherein the mobile device comprises a mobile network device having a display.

10. The method of claim 9, wherein the mobile network device is provided with software for the purpose of contacting a control device of the vehicle and authenticating the identity of a user of the vehicle before transmitting the data.

11. A computer implemented method of operating a convertible top of a vehicle, the computer implemented method comprising:
    monitoring an interior space of the vehicle and an exterior region outside of the vehicle;
    transmitting data relating to the monitoring of the interior space and the exterior region to a mobile device; and
    actuating the convertible top, via the mobile device, after transmitting the data,
    wherein the mobile device provides an option to cancel a process of opening or closing the convertible top of the vehicle when the transmitted data indicates that an object is within a specific spatial zone of the vehicle, and
    wherein actuation of the convertible top is performed after displaying the data for a specific predetermined period of time.

12. The computer implemented method of claim 11, further comprising, prior to transmitting the data, authenticating an identity of a user of the vehicle via the mobile control device.

13. The computer implemented method of claim 11, wherein transmitting the data comprises transmitting the data via the group consisting of Bluetooth ®, mobile network, WiMAX® and WLAN.

14. The computer implemented method of claim 11, wherein:
    monitoring the interior space is performed via a first video monitoring system; and
    monitoring the exterior region is performed via a second video monitoring system.

15. The computer implemented method of claim 11, wherein:
    the first video monitoring system comprises a camera monitoring system; and
    the second video monitoring system comprises camera sensors.

16. A computer implemented method comprising:
    monitoring an interior space of a vehicle and an exterior region outside of the vehicle;
    authenticating an identity of a user of the vehicle;

transmitting data relating to the monitoring of the interior space and the exterior region to a mobile device of the user upon a positive authentication of the identity of the user; and actuating a convertible top of the vehicle after transmitting the data, wherein the user is provided with an option on the mobile device to cancel a process of opening or closing the convertible top of the vehicle when the transmitted data indicates that an object is within a specific spatial zone of the vehicle, and wherein actuation of the convertible top is performed after displaying the data for a specific predetermined period of time.

* * * * *